(12) United States Patent
Kanai et al.

(10) Patent No.: US 7,599,546 B2
(45) Date of Patent: Oct. 6, 2009

(54) IMAGE INFORMATION PROCESSING SYSTEM, IMAGE INFORMATION PROCESSING METHOD, IMAGE INFORMATION PROCESSING PROGRAM, AND AUTOMOBILE

(75) Inventors: Kazunori Kanai, Wako (JP); Nobuharu Nagaoka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 718 days.

(21) Appl. No.: 11/288,695

(22) Filed: Nov. 29, 2005

(65) Prior Publication Data

US 2006/0115144 A1 Jun. 1, 2006

(30) Foreign Application Priority Data

Nov. 30, 2004 (JP) ............................. 2004-347737

(51) Int. Cl.
*G06K 9/00* (2006.01)
*H04N 13/02* (2006.01)
(52) U.S. Cl. ........................ 382/154; 382/104; 382/106; 348/47; 348/118; 348/148; 250/559.31; 250/559.38
(58) Field of Classification Search ................. 382/104, 382/154
See application file for complete search history.

(56) References Cited

U.S. PATENT DOCUMENTS 5,304,980 A * 4/1994 Maekawa ................... 340/435

(Continued)

FOREIGN PATENT DOCUMENTS

JP 2002-298298 10/2002

(Continued)

OTHER PUBLICATIONS

Multi-image matching for general motion Stereo camera model, Ja Seong et al. 1998, IEEE, 0-8186-8821-1, 608-612.*

(Continued)

*Primary Examiner*—Brian P Werner
*Assistant Examiner*—Jayesh Patel
(74) *Attorney, Agent, or Firm*—Carrier, Blackman & Associates, P.C.; Joseph P. Carrier; William D. Blackman

(57) ABSTRACT

A system and the like capable of stably displaying image information according to an object shot by infrared cameras by offsetting disadvantages of two-dimensional image processing and three-dimensional image processing. According to an image information processing system 100 of the present invention, a weighting factor calculation unit 140 calculates a first weighting factor C1 ($0 \leq C1 \leq 1$) and a second weighting factor C2 ($=1-C1$), on the basis of a measured value of a variable according to a distance between infrared cameras 210 and an object. Moreover, a composite image recognition unit 150 recognizes a composite image area A composed of a first image area A1 recognized by a first image area recognition unit 110 through the infrared camera 210 by performing the two-dimensional image processing and the second image area A2 recognized by a second image area recognition unit 120 through the infrared cameras 210 by performing the three-dimensional image processing, with being weighted by the first weighting factor C1 and the second weighting factor C2, respectively. Then, the image information control unit 160 causes the HUD 110 to display a frame enclosing the composite image area A.

7 Claims, 7 Drawing Sheets

U.S. PATENT DOCUMENTS

| | | | |
|---|---|---|---|
| 5,625,408 A * | 4/1997 | Matsugu et al. | 348/42 |
| 5,692,061 A * | 11/1997 | Sasada et al. | 382/106 |
| 5,801,760 A * | 9/1998 | Uomori | 348/47 |
| 5,937,079 A * | 8/1999 | Franke | 382/103 |
| 6,556,236 B1 * | 4/2003 | Swift et al. | 348/56 |
| 6,611,283 B1 * | 8/2003 | Isonuma | 348/51 |
| 6,658,150 B2 * | 12/2003 | Tsuji et al. | 382/218 |
| 6,996,267 B2 * | 2/2006 | Tabata | 382/154 |
| 7,043,074 B1 * | 5/2006 | Darbee | 382/154 |
| 7,277,559 B2 * | 10/2007 | Matsunaga et al. | 382/103 |
| 2001/0048763 A1 * | 12/2001 | Takatsuka et al. | 382/154 |
| 2006/0029272 A1 * | 2/2006 | Ogawa | 382/154 |
| 2006/0098093 A1 * | 5/2006 | Hahn et al. | 348/148 |

FOREIGN PATENT DOCUMENTS

| | | |
|---|---|---|
| JP | 2003-134508 | 5/2003 |

OTHER PUBLICATIONS

Multi-image matching for a general motion stereo camera model, Seong et al. IEEE, 0-8186-8821-1, 1998, pp. 608-612.*

* cited by examiner

IMAGE INFORMATION PROCESSING SYSTEM, IMAGE INFORMATION PROCESSING METHOD, IMAGE INFORMATION PROCESSING PROGRAM, AND AUTOMOBILE

BACKGROUND OF THE INVENTION

1. Field of the Invention

The present invention relates to a system and a method for processing an image of an object shot by an infrared camera mounted in a mobile body and displaying image information regarding the object on an image display device mounted in the mobile body, a program for imparting the image information processing function to a computer, and an automobile as the mobile body provided with the system.

2. Related Background Art

Conventionally, there has been suggested a technique for performing image processing such as gray scale or binarization processing of a two-dimensional image of an object shot by an infrared camera and thereby recognizing an image area according to the object before highlighting it on the image display device (for example, refer to Japanese Patent Laid-Open No. 2003-134508). Moreover, there has been suggested a technique for performing image processing using parallax of a three-dimensional image of an object stereographically shot by two infrared cameras and thereby recognizing an image area according to the object before highlighting it on the image display device (for example, refer to Japanese Patent laid-Open No. 2002-298298). If these techniques are employed, for example, for an automobile, it is possible to get a driver of the automobile, which is running on a road at night or in poor visibility, to easily recognize the existence of a pedestrian or the like that cannot be easily distinguished by the naked eye.

According to the two-dimensional image processing, there is a case where a plurality of image areas are recognized according to a single object through binarization processing of a gray scaled image ("a splitting phenomenon" occurs). For example, in the state where a single image area A is highlighted according to a single object O as shown in FIG. 6(a), if the distance between a camera and the object is decreased, a splitting phenomenon may occur to thereby highlight three image areas A on the image display device according to the single object O as shown in FIG. 6(b) in some cases. Such a situation confuses an automobile driver or other person who is viewing the image display device and further may cause him or her to feel insecure about reliability of the image.

Moreover, the three-dimensional image processing is of inferior followability to image fluctuations of the object being shot by the camera. For example, in the state where the image area A according to the object O is recognized as shown in FIG. 7(a), if the camera moves slightly downward and thereby the image of the object O moves slightly upward, the recognized image area A insufficiently follows the image movement of the object O as shown in FIG. 7(b). Particularly when the object is far from the camera, even if slightly the camera moves, the image movement of the object becomes large. Such a situation makes the driver feel a sense of incongruity between the non-followability of the image area to automobile pitching or other movements and the driver's bodily sensation and further may cause him or her to feel insecure about reliability of the image.

SUMMARY OF THE INVENTION

Therefore, it is an object of the present invention to provide a system, a method, and the like capable of stably displaying image information according to an object shot by infrared cameras by offsetting the disadvantages of the two-dimensional image processing and the three-dimensional image processing.

According to one aspect of the present invention to achieve the above object, there is provided an image information processing system for processing an image of an object shot by infrared cameras mounted on a movable body and thereby displaying image information of the object on an image display device mounted on the movable body, the image information processing system comprising: first image area recognition means for recognizing an image area according to the object as a first image area by performing two-dimensional image processing of the object shot by an infrared camera; second image area recognition means for recognizing an image area according to the object as a second image area by performing three-dimensional image processing of the object stereographically shot by two infrared cameras; variable measurement means for measuring a variable whose value changes with a distance between the infrared cameras and the object; weighting factor calculation means for calculating a first weighting factor C1 ($0 \leq C1 \leq 1$) having a property of increasing along with an increase in the distance according to the variable and calculating a second weighting factor C2 ($=1-C1$) having a property of increasing along with a decrease in the distance according to the variable, on the basis of the variable measured by the variable measurement means; composite image area recognition means for recognizing a composite image area composed of the first image area recognized by the first image area recognition means and the second image area recognized by the second image area recognition means, with being weighted by the first weighting factor C1 and the second weighting factor C2 calculated by the weighting factor calculation means, respectively; and image information control means for causing the image display device to display image information according to the composite image area recognized by the composite image area recognition means.

According to the image information processing system of the present invention, the first image area recognition means recognizes "the first image area" by performing the two-dimensional image processing of the object shot by the infrared camera. The two-dimensional image processing has a disadvantage of possibly causing a splitting phenomenon as described above, while having an advantage of superior followability to the image fluctuations of the object shot by the camera. For example, in the state where the image area A is recognized according to the object O as shown in FIG. 6(a), if the image of the object O moves slightly upward as shown in FIG. 6(c) (See arrows), it is possible to recognize the image area A that has moved slightly upward, sensitively following the movement. Therefore, the first image area is excellent in followability to the image movement of the object.

Moreover, the second image area recognition means recognizes "the second image area" by the three-dimensional image processing of the object stereographically shot by two infrared cameras. The three-dimensional image processing has a disadvantage of inferior followability to the movement as described above, while having an advantage of not causing a splitting phenomenon. For example, in the state where the single image area A according to the object O is recognized as shown in FIG. 7(a), even if the distance between the cameras and the object is decreased, the single image area A is recognized according to the single object O as shown in FIG. 7(c). Therefore, the number of second image areas accurately corresponds to the number of objects.

Moreover, the variable measurement means measures "the variable" according to the distance between the infrared cameras and the object. In addition, the weighting factor calculation means calculates "the first weighting factor C1 ($0 \leqq C1 \leqq 1$)" and "the second weighting factor C2 (=1−C1)" on the basis of the variable measured by the variable measurement means. The variable measured by the variable measurement means may be the distance itself or may be a variable as an increasing or decreasing function of the distance.

Moreover, the composite image area recognition means recognizes "the composite image area" composed of "the first image area" recognized by the first image area recognition means and "the second image area" recognized by the second image area recognition means, with being weighted by the first weighting factor C1 and the second weighting factor C2, respectively. The image information control means causes the image display device to display "image information" according to the composite image area recognized by the composite image area recognition means. This enables the driver of the movable body or other person who is viewing the image display device to recognize the existence of the object shot by the infrared cameras and further its position, size, and the like.

As described above, the composite image area is composed of the first and second images areas with being weighed by the first and second weighting factors, respectively.

The first weighting factor C1 has a property of increasing along with an increase in the distance between the infrared cameras and the object. Therefore, when the distance is large, the property of the first image area is more strongly reflected on the composite image area than the property of the second image area. Thereby, the composite image area strongly reflects the property of the first image area of superior followability to the image movement of the object. In other words, in the composite image area, the disadvantage of the three-dimensional image processing of inferior followability to the movement is offset by the advantage of the two-dimensional image processing of superior followability to the movement. Furthermore, if the distance between the infrared cameras and the object is large, splitting of the first image area does not easily occur. Therefore, even if the composite image area strongly reflects the property of the first image area, it is possible to prevent a plurality of composite image areas from being recognized according to a single object.

On the other hand, the second weighting factor C2 has a property of increasing along with a decrease in the distance between the infrared cameras and the object. Therefore, when the distance between the infrared cameras 210 and the object is small, the property of the second image area A2 can be more strongly reflected on the composite image area than the property of the first image area A1. Thereby, the composite image area strongly reflects the property of the second image area of not causing a splitting phenomenon. In other words, in the composite image area, the disadvantage of the two-dimensional image processing of possibly causing a splitting phenomenon is offset by the advantage of the three-dimensional image processing of not causing a splitting phenomenon. Furthermore, if the distance is small, the image of the object moves only slightly if it is caused by the infrared camera shake, and therefore the inferior followability to the movement of the second image area will not be a significant problem. Therefore, even if the composite image area strongly reflects the property of the second image area, it is possible to prevent the recognition of a quite different composite image area from the image of the object that has moved.

According to the image information processing system of the present invention, it is possible to cause the image display device to stably display the image information according to the object shot by the infrared cameras by offsetting the disadvantages of the two-dimensional image processing and the three-dimensional image processing.

Moreover, in the image information processing system according to the present invention, preferably the variable measurement means measures an elapsed time t at a time point after elapse of a predetermined period of time since the start time of shooting the object by using the infrared cameras as the variable, and the weighting factor calculation means calculates the first weighting factor C1 according to a decreasing function C1(t) of the time t and calculates the second weighting factor C2 according to an increasing function C2(t) of the time t, on the basis of the time t measured by the variable measurement means.

Furthermore, in the image information processing system according to the present invention, preferably the weighting factor calculation means calculates the first weighting factor C1 according to the first function C1(t)=1/(Ct+1) (C>0) and calculates the second weighting factor C2 according to the second function C2(t)=1−{1/(Ct+1)}, on the basis of the time t measured by the variable measurement means.

According to another aspect of the present invention to achieve the above object, there is provided an image information processing method for processing an image of an object shot by infrared cameras mounted on a movable body and thereby displaying image information of the object on an image display device mounted on the movable body, the image information processing method comprising: a first image area recognition step of recognizing an image area according to the object as a first image area by performing two-dimensional image processing of the object shot by an infrared camera; a second image area recognition step of recognizing an image area according to the object as a second image area by performing three-dimensional image processing of the object stereographically shot by two infrared cameras; a variable measurement step of measuring a variable whose value changes with a distance between the infrared cameras and the object; a weighting factor calculation step of calculating a first weighting factor C1 ($0 \leqq C1 \leqq 1$) having a property of increasing along with an increase in the distance according to the variable and calculating a second weighting factor C2 (=1−C1) having a property of increasing along with a decrease in the distance according to the variable, on the basis of the variable measured in the variable measurement step; a composite image area recognition step of recognizing a composite image area composed of the first image area recognized in the first image area recognition step and the second image area recognized in the second image area recognition step, with being weighted by the first weighting factor C1 and the second weighting factor C2 calculated in the weighting factor calculation step, respectively; and an image information control step of causing the image display device to display image information according to the composite image area recognized in the composite image area recognition step.

According to the image information processing method of the present invention, it is possible to cause the image display device to stably display the image information according to the object shot by the infrared cameras by offsetting the disadvantages of the two-dimensional image processing and the three-dimensional image processing.

According to still another aspect of the present invention to achieve the above object, there is provided an image information processing program for imparting a computer a function of processing an image of an object shot by infrared cameras mounted on a movable body and thereby displaying image information of the object on an image display device mounted on the movable body, the function comprising: a first image area recognition function of recognizing an image area according to the object as a first image area by performing two-dimensional image processing of the object shot by an infrared camera; a second image area recognition function of recognizing an image area according to the object as a second image area by three-dimensional image processing of the object stereographically shot by two infrared cameras; a variable measurement function of measuring a variable whose value changes with the distance between the infrared cameras and the object; a weighting factor calculation function of calculating a first weighting factor C1 ($0 \leqq C1 \leqq 1$) having a property of increasing along with an increase in the distance according to the variable and calculating a second weighting factor C2 (=1−C1) having a property of increasing along with a decrease in the distance according to the variable, on the basis of the variable measured using the variable measurement function; a composite image area recognition function of recognizing a composite image area composed of the first image area recognized using the first image area recognition function and the second image area recognized using the second image area recognition function, with being weighted by the first weighting factor C1 and the second weighting factor C2 calculated using the weighting factor calculation function, respectively; and an image information control function of causing the image display device to display image information according to the composite image area recognized using the composite image area recognition function.

According to the image information processing program of the present invention, it is possible to give the computer the function of causing the image display device to stably display the image information according to the object shot by the infrared cameras by offsetting the disadvantages of the two-dimensional image processing and the three-dimensional image processing.

According to still another aspect of the present invention to achieve the above object, there is provided an automobile, as the movable body, on which the image information processing system according to claim 1 is mounted.

According to the automobile of the present invention, it is possible to get the automobile driver to recognize the image information by stably displaying the image information according to the object shot by the infrared cameras on the image display device by offsetting the disadvantages of the two-dimensional image processing and the three-dimensional image processing.

DETAILED DESCRIPTION OF THE PREFERRED EMBODIMENTS

An image information processing system, an information processing method, an information processing program, and an automobile according to the present invention will be described hereinafter by using the accompanying drawings.

Figure 1:
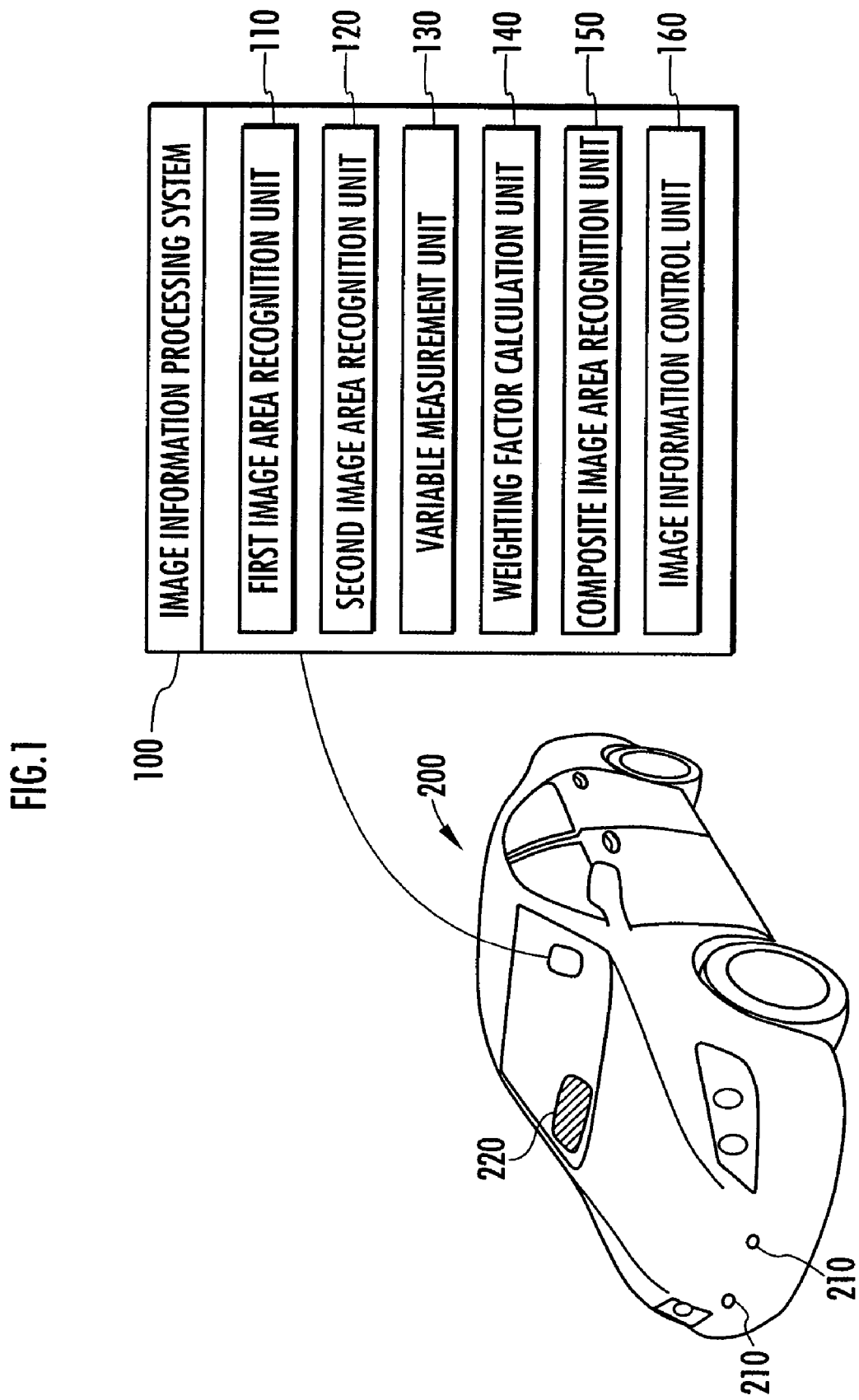
FIG. 1 is a configuration explanatory diagram showing an image information processing system according to an embodiment of the present invention.
Figure 2:
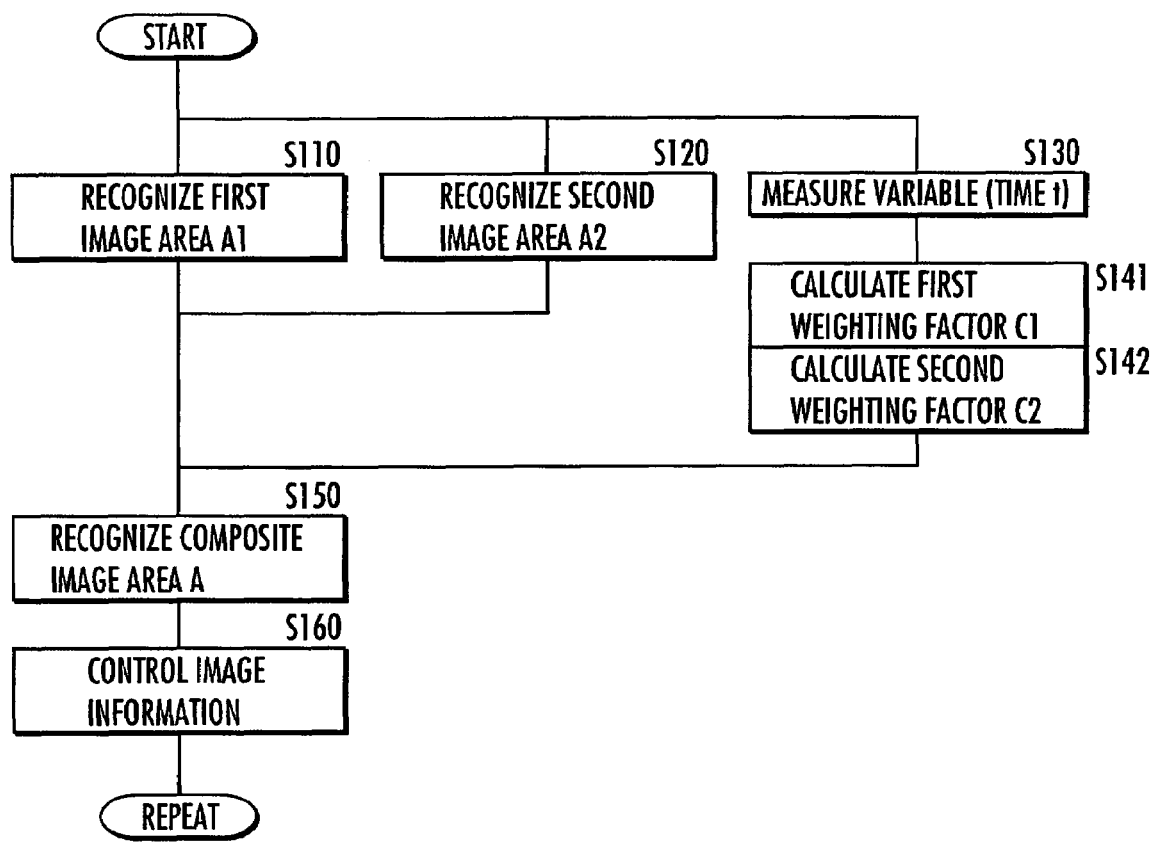
FIG. 2 is an explanatory diagram showing an image information processing method according to an embodiment of the present invention.
Figure 3A:
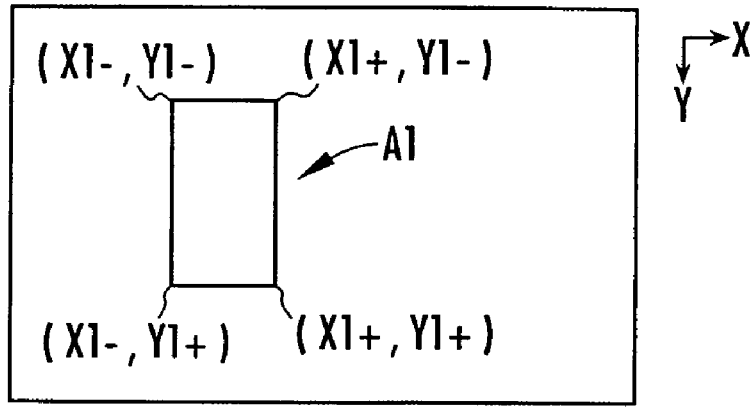
FIG. 3 is an explanatory diagram showing a first image area, a second image area, and a composite image area.
Figure 3B:
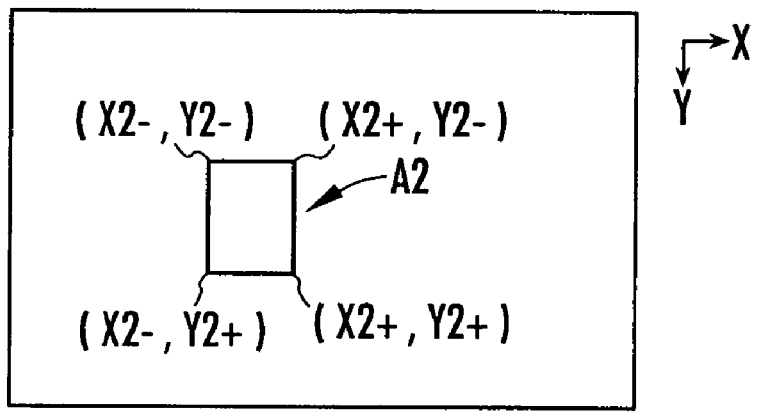
Figure 4:
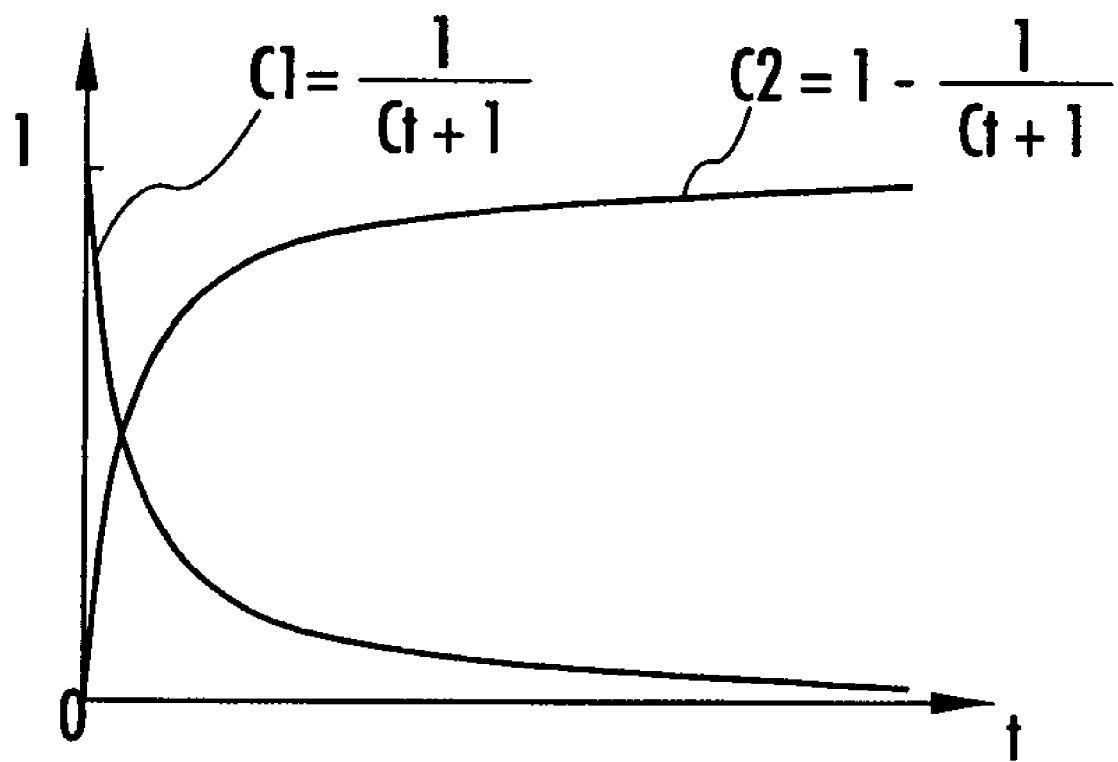
FIG. 4 is an explanatory diagram showing a change in time of first and second weighting factors.
Figure 5A:
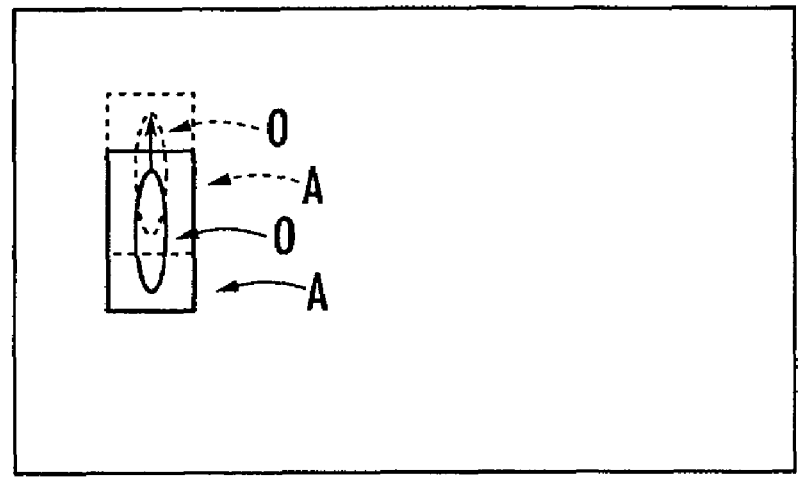
FIG. 5 is an explanatory diagram showing a change in time of a composite image area.
Figure 5B:
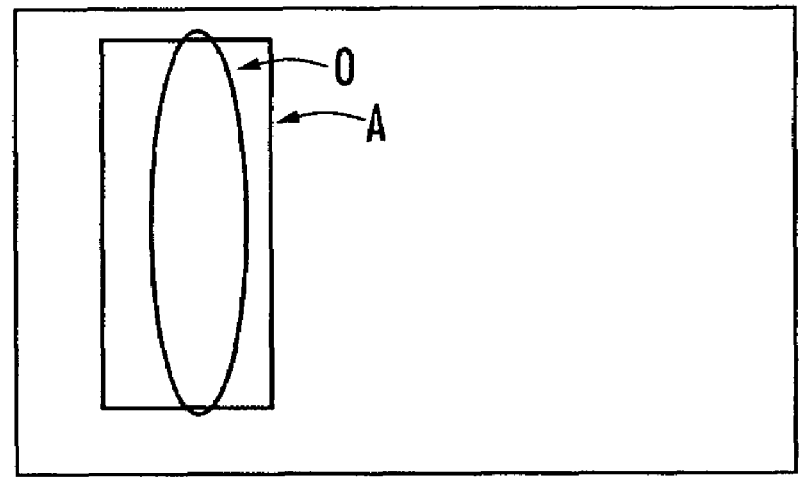
Figure 6A:
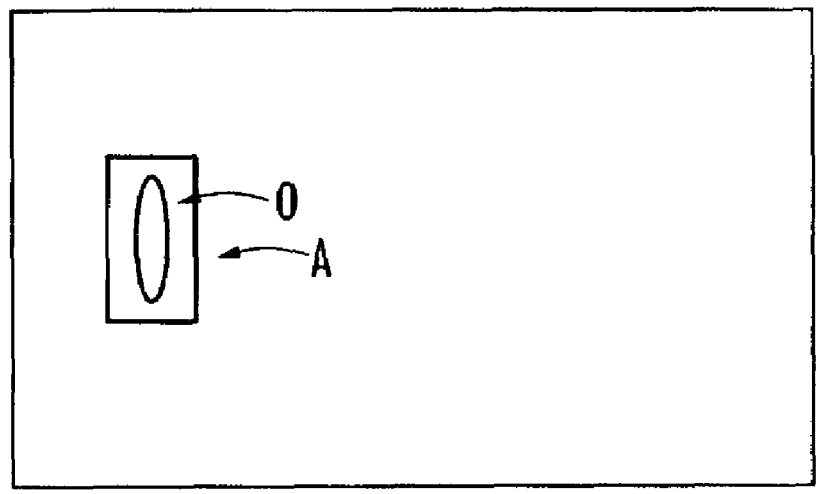
FIG. 6 is an explanatory diagram showing an image area recognized by two-dimensional image processing.
Figure 6B:
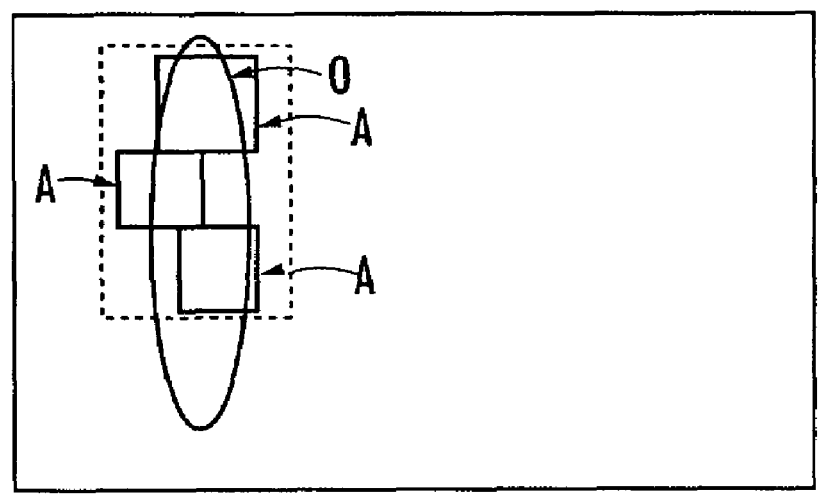
Figure 6C:
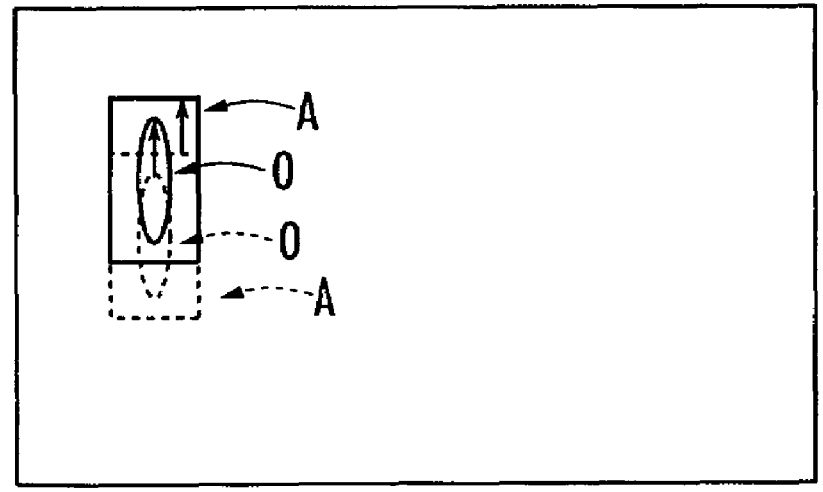
Figure 7A:
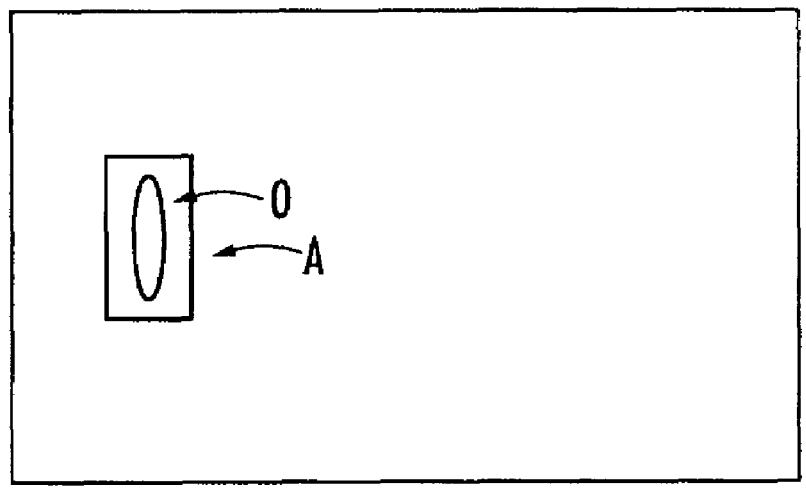
FIG. 7 is an explanatory diagram showing an image area recognized by three-dimensional image processing.
Figure 7B:
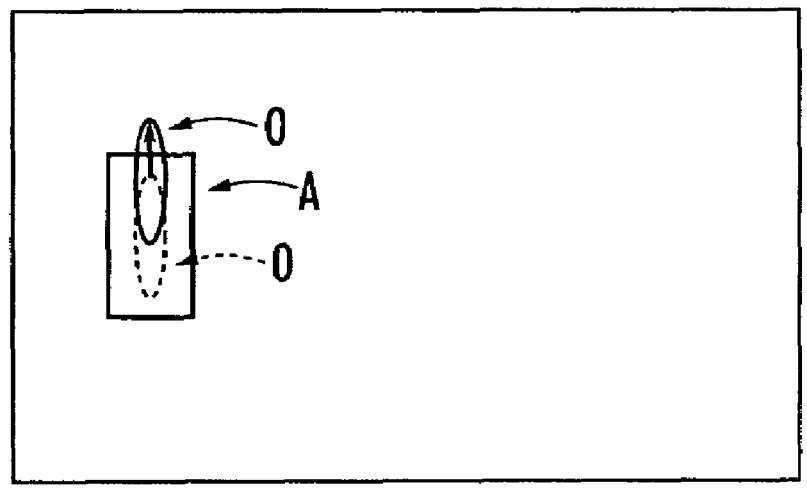
Figure 7C:
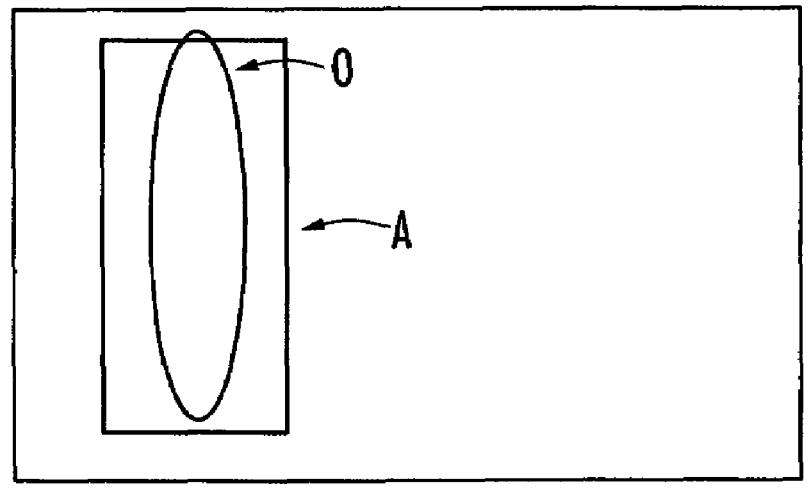

FIG. 1 shows a configuration explanatory diagram of an image information processing system according to an embodiment of the present invention. FIG. 2 shows an explanatory diagram of an image information processing method according to an embodiment of the present invention. FIG. 3 shows an explanatory diagram of a first image area, a second image area, and a composite image area. FIG. 4 shows an explanatory diagram of a change in time of first and second weighting factors. FIG. 5 shows an explanatory diagram of a change in time of a composite image area. FIG. 6 shows an explanatory diagram of an image area recognized by two-dimensional image processing. FIG. 7 shows an explanatory diagram of an image area recognized by three-dimensional image processing.

An information service system 100 shown in FIG. 1 is mounted in an appropriate position of an automobile (movable body) 200. Two infrared cameras 210 are mounted at right and left, respectively, on the front portion of the automobile 200. Moreover, a head up display (HUD) (an image display device) 220 is mounted on the front window of the automobile 200 in a position where the HUD 220 does not hinder the driver's field of front vision.

The image information processing system 100 includes a computer readable medium encoded with a computer program including: a first image area recognition unit 110, a second image area recognition unit 120, a variable measurement unit 130, a weighting factor calculation unit 140, a composite image area recognition unit 150, and an image information control unit 160. Each unit is composed of a CPU, ROM, RAM, or the like as hardware and "an image information processing program" of the present invention as software for giving executive functions of an image information processing method described later to the hardware.

The first image area recognition unit 110 performs two-dimensional image processing of an object shot by the infrared camera 210 to thereby recognize an image area according to the object as "a first image area."

The second image area recognition unit 120 performs three-dimensional image processing of an object stereographically shot by the two infrared cameras 210 to thereby recognize an image area according to the object as "a second image area."

The variable measurement unit 130 measures an elapsed time t since the start time of shooting the object by the infrared cameras 210 as "a variable whose value changes with the distance between the infrared cameras 210 and the object." The time t increases along with a decrease in the distance between the infrared cameras 210 and the object.

The weighting factor calculation unit 140 calculates a first weighting factor C1 ($0 \leqq C1 \leqq 1$) and calculates a second weighting factor C2 (=1−C1), on the basis of the time t measured by the variable measurement unit 130.

The composite image area recognition unit 150 recognizes "a composite image area" composed of the first image area recognized by the first image area recognition unit 110 and the second image area recognized by the second image area recognition unit 120, with being weighted by the first weighting factor C1 and the second weighting factor C2 calculated by the weighting factor calculation unit 140, respectively.

The image information control unit 160 causes the HUD 220 to display "image information" according to the composite image area recognized by the composite image area recognition unit 150.

The following describes an image information processing method according to an embodiment of the present invention, which is performed by the image information processing system 100 having the above configuration, with reference to FIG. 2 to FIG. 7.

The first image area recognition unit 110 performs the two-dimensional image processing of an object shot by the infrared camera 210 to thereby recognize an image area according to the object as a first image area A1 (S110). Thereby, for example, as shown in FIG. 3(a), the first image area recognition unit 110 recognizes the rectangular first image area A1 having the four corners whose coordinates are represented by (X1+, Y1−), X(1+, Y1+), (X1−, Y1+), and (X1−, Y1−) in the clockwise order from the top right corner. As for the method of recognizing the first image area A1 by the two-dimensional image processing, for example, the method disclosed in Japanese Patent Laid-Open No. 2003-134508 may be used. Therefore, detailed description of the method is omitted in this specification. If a plurality of image areas A1 are recognized with respect to a single object by a splitting phenomenon (See FIG. 6(b)), a rectangular image area covering the plurality of first image areas A1 (See the dashed line in FIG. 6(b)) is recognized as a new first image area A1 on condition that the shortest distance in the vertical direction or in the horizontal direction of the plurality of first image areas A1 is a predetermined distance or shorter.

Moreover, in parallel with the recognition of the first image area A1, the second image area recognition unit 120 performs the three-dimensional image processing of the object stereographically shot by the two infrared cameras 210 to thereby recognize an image area according to the object as a second image area A2 (S120). Thereby, for example, as shown in FIG. 3(b), the second image area recognition unit 120 recognizes a rectangular second image area A2 having the four corners whose coordinates are represented by (X2+, Y2−), X(2+, Y2+), (X2−, Y2+), and (X2−, Y2−) in the clockwise order from the top right corner. As for the method of recognizing the second image area A2 by the three-dimensional image processing, for example, the method disclosed in Japanese Patent Laid-Open No. 2002-298298 may be used. Therefore, detailed description of the method is omitted in this specification.

Moreover, the variable measurement unit 130 measures an elapsed time t at a time point after elapse of a predetermined period of time since the object is shot by the infrared cameras 210 (S130). The predetermined period of time may be variably set on the basis of a distance between the automobile 200 and the object that can be measured through the infrared cameras 210 or a relative velocity between both of them, which is a time derivative thereof. In addition, the weighting factor calculation unit 140 calculates the first weighting factor C1 according to the first function C1(t) defined by the following formula (1) (S141) and calculates the second weighting factor C2 according to the second function C2(t) defined by the following formula (2), on the basis of the time t measured by the variable measurement unit 130 (S142):

$$C1(t)=1/(Ct+1) \tag{1}$$

$$C2(t)=1-1/(Ct+1) \tag{2}$$

In the formulas (1) and (2), C is a positive constant. The constant C may be set for each object, for example, on the basis of a distance from the infrared cameras 210 to the object measured through the infrared cameras 210. Since the first function C1(t) is a decreasing function of the time t as shown in FIG. 4, the first weighting factor C1 has a property of decreasing along with a decrease in the distance between the infrared cameras 210 and the object. On the other hand, since the second function C2(t) is an increasing function of the time t as shown in FIG. 4, the second weighting factor C2 has a property of increasing along with a decrease in the distance between the infrared cameras 210 and the object.

Subsequently, the composite image area recognition unit 150 recognizes a composite image area A composed of the first image area A1 recognized by the first image area recognition unit 110 and the second image area A2 recognized by the second image area recognition unit 120, with being weighted by the first weighting factor C1 and the second weighting factor C2 calculated by the weighting factor calculation unit 140, respectively (S150). Supposing that the first image area A1 and the second image area A2 are represented as vectors, the composite image area A is recognized according to the following formula (3):

$$A=C1 \cdot A1+C2 \cdot A2 \tag{3}$$

Figure 3C:
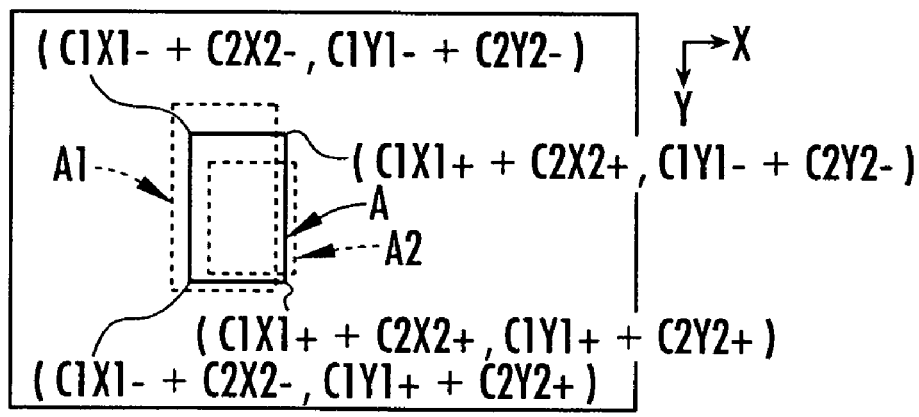

For example, a rectangular composite image area A shown in FIG. 3(c) is recognized on the basis of the first image area A1 and the second image area A2 shown in FIG. 3(a) and FIG. 3(b), respectively. The coordinates of the four corners of the composite image area A (X+, Y−), (X+, Y+), (X−, Y+), and (X−, Y−) can be expressed by the following formulas (3a) to (3d) as the coordinates of the four corners of the first image area A1 (X1+, Y1−), (X1+, Y1+), (X1−, Y1+), and (X1−, Y1−) and the coordinates of the four corners of the second image area A2 (X2+, Y2−), (X2+, Y2+), (X2−, Y2+), and (X2−, Y2−) weighted averaged by the first weighting factor C1 and the second weighting factor C2, respectively:

$$(X+,Y-)=(C1 \cdot X1++C2 \cdot X2+,C1 \cdot Y1-+C2 \cdot Y2-) \tag{3a}$$

$$(X+,Y+)=(C1 \cdot X1++C2 \cdot X2+,C1 \cdot Y1++C2 \cdot Y2+) \tag{3b}$$

$$(X-,Y+)=(C1 \cdot X1-+C2 \cdot X2-,C1Y1++C2 \cdot Y2+) \tag{3c}$$

$$(X-,Y-)=(C1 \cdot X1-+C2 \cdot X2-,C1 \cdot Y1-+C2 \cdot Y2-) \tag{3d}$$

Then, the image information control unit 160 causes the HUD 220 to display a frame enclosing the composite image area A recognized by the composite image area recognition unit 150 as image information according to the composite image area A (S160). Thereby, if the distance between the infrared cameras 210 and the object is small, for example, as shown in FIG. 5(a), the frame enclosing the single composite image area A according to the single object O is highlighted on the HUD 220. If the distance between the infrared camera 210 and the object is large, for example, as shown in FIG. 5(b), the frame enclosing the single composite image area A according to the single object O, which is larger than in FIG. 5(a), is highlighted on the HUD 220.

According to the image information processing method, the composite image area A is composed of the first image area A1 and the second image area A2, with being weighted by the first weighting factor C1 and the second weighting factor C2, respectively (See the formula (3) and FIG. 3(a) to FIG. 3(c)).

The first function C1(t) is a decreasing function of the time t for which the image of the object is being taken by the infrared cameras 210 (See the formula (1) and FIG. 4). Therefore, the first weighting factor C1 has a property of increasing along with the increase in the distance between both of them, which is a decreasing function of the time t. Therefore, if the time t measured by the variable measurement unit 130 is short, in other words, if the distance between the automobile 200 (accurately, the infrared cameras 210) and the object is large, the composite image area A can reflect the property of the first image area A1 more strongly than the property of the second image area A2. It should be noted here that, however, the condition that the distance between the automobile 200 and the object is a decreasing function of the time t is satisfied only when a relative distance between them is decreasing, for example, when the automobile 200 is moving forward since the infrared cameras 210 are for use in shooting the object ahead of the automobile 200 (See FIG. 1).

Thereby, if the time t is short, the property of the first image area A1 of superior followability to the image movement of the object is strongly reflected on the property of the composite image area A, which is recognized by the composite image area recognition unit 150 and then whose frame (image information) is displayed on the HUD 220 by the image information control unit 160. In other words, in the composite image area A, the disadvantage of the three-dimensional image processing of inferior followability to the movement is offset by the advantage of the two-dimensional image processing of superior followability to the movement. Furthermore, if the time t is short, in other words, if the distance between the automobile 200 and the object is large, splitting of the first image area A1 does not easily occur. Therefore, even if the composite image area A strongly reflects the property of the first image area A1, it is possible to prevent a plurality of composite image areas A from being recognized according to a single object and then displayed on the HUD 220.

For example, as shown in FIG. 5(a), even if the image of the object O moves slightly upward due to pitching of the automobile 200 (See the arrows and dashed lines) in the state where a composite image area A is displayed on the HUD 220 according to a relatively small object O since the time t is short, the composite image area A having moved upward following the movement can be recognized and then displayed on the HUD 220 (See the dashed lines).

On the other hand, the second function C2(t) is an increasing function of the time t for which the image of the object is being taken by the infrared cameras 210 (See the formula (2) and FIG. 4). Therefore, the second weighting factor C2 has a property of increasing along with a decrease in the distance between both of them, which is a decreasing function of the time t. Therefore, if the time t measured by the variable measurement unit 130 is long, in other words, if the distance between the automobile 200 and the object is small, the composite image area A can reflect the property of the second image area A2 more strongly than the property of the first image area A1.

Thereby, if the time t is long, the property of the second image area A2 of not causing a splitting phenomenon is strongly reflected on the property of the composite image area A, which is recognized by the composite image area recognition unit 150 and then whose frame (image information) is displayed on the HUD 220 by the image information control unit 160. In other words, in the composite image area A, the disadvantage of possibly causing a splitting phenomenon of the two-dimensional image processing is offset by the advantage of not causing a splitting phenomenon of the three-dimensional image processing. Furthermore, if the time t is long, in other words, if the distance between the infrared cameras 210 and the object is small, the image of the object moves only slightly if it is caused by pitching of the automobile 200 and therefore the inferior followability to the movement of the second image area A2 will not be a significant problem. Therefore, even if the composite image area A strongly reflects the property of the second image area A2, it is possible to prevent the recognition of a quite different composite image area A from the image of the object O that has moved and the display thereof on the HUD 220.

For example, as shown in FIG. 5(b), if the image of a single object O, which is relatively large since the time t is long, is being taken by the infrared cameras, a single composite image area A according to this object O can be displayed on the HUD 220.

Therefore, according to the image information processing method executed by the image information processing system 100, the disadvantages of the two-dimensional image processing and the three-dimensional image processing can be offset, thereby enabling the HUD 220 to stably display the composite image area A according to the object shot by the infrared cameras 210.

While the image information is displayed on the HUD 220 mounted on the front window of the automobile 200 in this embodiment, it should be understood that image information may be displayed on a display built in a meter or a display of a navigation device (not shown), which is mounted on the automobile 200, as another embodiment.

While the first weighting factor C1 is calculated according to the first function C1(t) defined by the formula (1) (See S141) and the second weighting factor C2 is calculated according to the second function C2(t) defined by the formula (2) (See S142) in this embodiment, it should be understood that the first weighting factor C1 may be calculated according to a decreasing function of the time t having a different form from that of the formula (1) and the second weighting function C2 may be calculated according to an increasing function of the time t having a different form from that of the formula (2) as another embodiment.

While the time t is measured, the first weighting factor C1 is calculated according to the first function C1(t), which is a decreasing function of the time t (See S141), and the second weighting factor C2 is calculated according to the second function C2(t), which is an increasing function of the time t (See S142) in this embodiment, it should be understood that the distance d between the infrared cameras 210 and the object may be measured through the infrared cameras 210 by the variable measurement unit 130 and then the first weighting factor C1 may be calculated according to an increasing function of the distance d and the second weighting factor C2 may be calculated according to a decreasing function of the distance d on the basis of the measured distance d, as another embodiment.

While the frame enclosing the composite image area A is displayed on the HUD 220 as image information according to the composite image area A in this embodiment, it should be understood that: the composite image area A may be displayed on the HUD 220 in such a way as to be distinguishable from other image areas by its color, pattern, brightness, or the like; a frame enclosing an object itself having a certain or higher brightness in a gray-scaled or binarized image included in the composite image area A may be displayed on the HUD 220; a part or all of an object having a certain or higher brightness included in the composite image area may be displayed on the HUD 220 in such a way as to be distinguishable from other image areas by its color, pattern, brightness, or the like; and image information according to the composite image area A may be displayed on the HUD 220 in all other kinds of forms in which the composite image area A or an object having a certain or higher brightness included therein is distinguishable from other image areas, as other embodiments.

What is claimed is:

1. An image information processing system for processing an image of an object shot by two infrared cameras mounted in a vehicle and an image display device mounted thereon, and thereby displaying image information of the object on said image display device mounted on the vehicle comprising a computer-readable medium encoded with a computer program comprising:

a first image area recognition unit for recognizing an image area according to the object as a first image area by performing two-dimensional image processing of the object shot by a first one of said infrared cameras;

a second image area recognition unit for recognizing an image area according to the object as a second image area by performing three-dimensional image processing of the object stereographically shot by both of said infrared cameras;

a variable measurement unit for measuring a variable whose value changes with a distance between the infrared cameras and the object;

a weighting factor calculation unit for calculating a first weighting factor $C1$ ($0 \leq C1 \leq 1$) having a property of increasing along with an increase in the distance according to the variable and calculating a second weighting factor $C2$ ($=1-C1$) having a property of increasing along with a decrease in the distance according to the variable, on the basis of the variable measured by the variable measurement unit;

a composite image area recognition unit for recognizing a composite image area composed of a first two-dimensional image recognized by the first image area recognition unit being weighted by the first weighting factor $C1$ and a second three-dimensional image recognized by the second image area recognition unit being weighted by the second weighting factor $C2$; and an image information control unit for causing the image display device to display image information according to the composite image area recognized by the composite image area recognition unit.

2. The image information processing system according to claim 1, wherein: the variable measurement unit measures an elapsed time t at a time point after elapse of a predetermined period of time since the start time of shooting the object by using the two infrared cameras as the variable; and the weighting factor calculation unit calculates the first weighting factor $C1$ according to a decreasing function $C1(t)$ of the time t and calculates the second weighting factor $C2$ according to an increasing function $C2(t)$ of the time t, on the basis of the time t measured by the variable measurement unit.

3. An image information processing method for processing an image of an object shot by two infrared cameras mounted on a movable body and thereby displaying image information of the object on an image display device mounted on the movable body, the image information processing method comprising:

a processor;

said processor executing the processing steps of a first image area recognition step of recognizing an image area according to the object as a first image area by performing two-dimensional image processing of the object shot by an infrared camera;

a second image area recognition step of recognizing an image area according to the object as a second image area by performing three-dimensional image processing of the object stereograph ically shot by two infrared cameras;

a variable measurement step of measuring a variable whose value changes with a distance between the infrared cameras and the object;

a weighting factor calculation step of calculating a first weighting factor $C1$ ($0 \leq C1 \leq 1$) having a property of increasing along with an increase in the distance according to the variable and calculating a second weighting factor $C2$($=1-C1$) having a property of increasing along with a decrease in the distance according to the variable, on the basis of the variable measured in the variable measurement step;

a composite image area recognition step of recognizing a composite image area composed of the first image area recognized in the first image area recognition step and the second image area recognized in the second image area recognition step, with being weighted by the first weighting factor $C1$ and the second weighting factor $C2$ calculated in the weighting factor calculation step, respectively; and an image information control step of causing the image display device to display image information according to the composite image area recognized in the composite image area recognition step.

4. The image information processing system in a vehicle according to claim 1, wherein the variable measurement unit measures elapsed time, and wherein the weighting factor calculation unit uses a measurement of elapsed time from the variable measurement unit in calculating the first weighting factor.

5. An image information processing method according to claim 3, wherein the variable measurement step involves measurement of elapsed time, and wherein the weighting factor calculation step uses a measurement of elapsed time from the variable measurement step in calculating the first weighting factor.

6. An image information processing system for processing an image of an object shot by two infrared cameras mounted in a vehicle and an image display device mounted thereon, and thereby displaying image information of the object on said image display device mounted on the vehicle, comprising a computer-readable medium encoded with a computer program comprising:

a first image area recognition unit for recognizing an image area according to the object as a first image area by performing two-dimensional image processing of the object shot by a first one of said infrared cameras;

a second image area recognition unit for recognizing an image area according to the object as a second image area by performing three-dimensional image processing of the object stereographically shot by both of said infrared cameras;

a variable measurement unit for measuring a time t at a point after an elapse of a predetermined period of time since the start time of shooting the object using said infrared cameras;

a weighting factor calculation unit for calculating a first weighting factor $C1$ ($0 \leq C1 \leq 1$) according to the first function $C1(t)=1/(Ct+1)$ ($C>0$) and calculating a second weighting factor $C2$ according to the second function $C2(t)=1-\{1/Ct+1\}$, on the basis of time measured by the variable measurement unit;

a composite image area recognition unit for recognizing a composite image area composed of a first two-dimensional image recognized by the first image area recognition unit being weighted by the first weighting factor $C1$ and a second three-dimensional image recognized by the second image area recognition unit being weighted by the second weighting factor $C2$; and an image information control unit for causing the image display device to display image information according to the composite image area recognized by the composite image area recognition unit.

7. The image information processing system in a vehicle according to claim 6, wherein the variable measurement unit measures elapsed time, and wherein the weighting factor calculation unit uses a measurement of elapsed time from the variable measurement unit in calculating the first weighting factor.

* * * * *

UNITED STATES PATENT AND TRADEMARK OFFICE
CERTIFICATE OF CORRECTION

PATENT NO. : 7,599,546 B2
APPLICATION NO. : 11/288695
DATED : October 6, 2009
INVENTOR(S) : Kanai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 981 days.

Signed and Sealed this

Twenty-eighth Day of September, 2010

David J. Kappos
*Director of the United States Patent and Trademark Office*